Aug. 16, 1932.  W. A. CHRYST  1,871,955
SHOCK ABSORBER
Filed Oct. 24, 1928
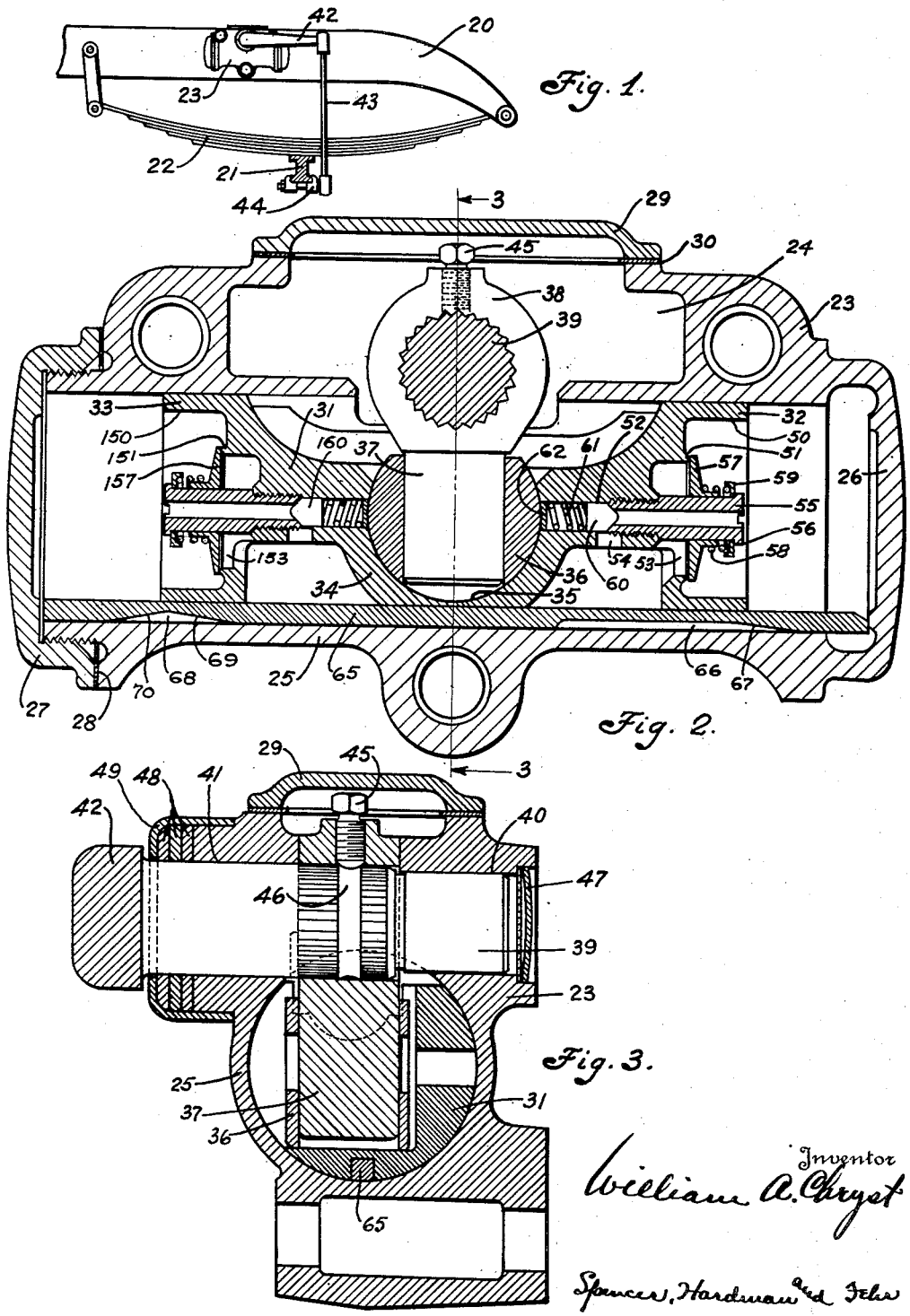

Patented Aug. 16, 1932

1,871,955

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed October 24, 1928. Serial No. 314,808.

This invention relates to improvements in shock absorbers particularly adapted for use on automotive and other vehicles having a frame or body supported by springs upon the road wheel axles.

It is among the objects of the present invention to provide a simple and compact cushioning device which will operate effectively to dissipate road shocks by cushioning the approaching and separating movements of the frame and axle of the vehicle.

Further objects and advantages of the present invention will be apparent from the following description, reference being had to the accompanying drawing wherein a preferred embodiment of one form of the present invention is clearly shown.

In the drawing:

Fig. 1 illustrates a front portion of the frame of an automotive vehicle supported by a spring upon the usual axle, the shock absorber embodying the present invention being shown applied thereto.

Fig. 2 is a longitudinal sectional view of the shock absorber.

Fig. 3 is a transverse sectional view taken on the line 3—3 of Fig. 2, certain parts being shown in elevation for the sake of clearness.

Referring to the drawing, the numeral 20 designates the frame of the vehicle which is supported upon the vehicle axle 21 by a series of springs, only one of which designated by the numeral 22 is shown.

The road wheels of the vehicle are not shown in the present drawing, but as usual are attached to the axle 21.

The shock absorber comprises a casing 23, presenting a fluid chamber 24 and a cylinder 25, one end of which is closed by the wall 26, the other end by a screw cap 27 provided with a gasket 28 to prevent leaks at this end of the cylinder. A cover 29 having a gasket 30 closes the fluid chamber 24 so that no fluid can leak therefrom.

Within the cylinder there is provided a double-headed piston 31, the piston head portions of which are designated by the numerals 32 and 33 respectively. These two piston head portions 32 and 33 are connected together by an intermediate web portion 34, said web portion having a transverse bore 35 for receiving the swivel block 36, which in turn is bored out to receive the cylindrical end 37 of the rocker arm 38. Rocker arm 38 is securely attached to a rocker shaft 39 which is journalled in bearings 40 and 41 provided by the casing 23, one end of the rocker arm extending from the casing and providing the shock absorber operating arm 42. The free end of this arm 42 has one end of the connecting rod 43 swivelly secured thereto, the other end of said connecting rod 43 being swivelly attached to a bracket 44 anchored to the axle 21. A set screw 45 in the rocker arm 38 engages with an annular groove 46 in the rocker shaft 39 to prevent relative endwise motion between the rocker arm 38 and rocker shaft 39. The open end of the casing portion presenting a bearing 40 is sealed by a plug 47. Fluid is prevented from leaking past the bearing 41 to the outside of the casing by gaskets 48 brought into sealing engagement with the rocker shaft 39 by packing gland 49 which fits tightly about the casing portion presenting the bearing 41.

Inasmuch as both piston head portions are alike, only one of them will be described detailedly. Referring particularly to Fig. 2, piston head 32 is bored out as at 50 providing an annular ledge 51 which forms a valve seat. Two passages are provided in the piston head portion 32, a central passage designated by the numeral 52 and a passage 53 which is centrally offset. A transverse passage 54 provides communication between the central passage 52 and the space behind the piston head 32 which is always in communication with the fluid chamber 24. The passages 53 and 52—54 provide for the transfer of fluid from one side of the piston head 32 to the other. A tubular member 55 has a screw threaded end fitting into the outer end of central passage 52, the outer end of said tubular member 55 having a head 56. Upon this tubular member 55 is slidably supported a valve 57 which is yieldingly maintained in engagement with the annular valve seat 51 by a spring 58 interposed between said valve 57 and the spring retaining collar 59 which engages with the inner surface of the head 56. The inner end of the tubular member 55 provides a valve seat for the valve 60 which is yieldingly maintained in engagement with the end of the tubular member 55 by a spring 61 interposed between valve 60 and a plug 62 inserted in the passage 52 adjacent the swivel block 36.

Corresponding parts of the piston head 33 are numbered with numerals 100 higher than the parts of the piston head 32. For example, the bored out portion 50 of the piston head 32 is numbered 150 in the piston head 33, the valve seat member 51 of head 32 is numbered 151 in piston head 33, etc. Both piston head portions 32 and 33 are provided with a longitudinal groove in their outer surfaces, said grooves aligning with each other. Within the cylinder 25 there is provided a metering pin 65 interposed between the closed ends of the cylinder and slidably fitting into the aforementioned longitudinal grooves of the piston heads. Adjacent the piston head portion 32 the metering pin 65 is provided with a recess 66, having a sloping wall 67 adjacent the outer end of the piston head 32 when the piston is in the intermediate normal position as shown in the Fig. 2. At the other end, or more specifically adjacent the outer end of the piston head portion 33, the metering pin is provided with a recess 68 having sloping surfaces 69 and 70, the converging point of said surfaces being substantially in alignment with the outer end of the piston head portion 33 when the piston is in the normal position as shown in Fig. 2. The sloping surfaces 67 and 69—70 cooperate with their respective piston head portions to provide variable flow orifices for the escape of fluid from the respective compression chambers as the piston head portions are moved toward their respective cylinder ends.

When the road wheels of the vehicle strike an obstruction in the roadway, spring 22 will be flexed toward the frame 20, causing the connecting rod 43 to move the operating lever 42 in a counter-clockwise direction, resulting in the piston within the cylinder being moved to the right as regards Fig. 2 by the corresponding counter-clockwise movement of the rocker arm 38. Fluid within the compression chamber between end 26 and piston portion 32 will have pressure exerted thereupon, causing the fluid to flow through the orifice presented by the recess 66 of the metering pin 65 and the piston head portion 32. This escape of fluid through this orifice is gradually, increasingly restricted as the piston head portion 32 moves toward the end 26 of the cylinder due to the fact that the piston head is approaching the converging point of the sloping surface 67 of recess 66 and the wall of the cylinder. This restriction of the fluid will gradually, increasingly resist the movement of the piston in this direction, consequently the flexing movement of the spring 22 toward the frame 20 will be resisted gradually, increasingly. When the piston head portion 32 is moved toward the right, piston head portion 33 is also moving in the same direction and fluid in the fluid chamber 24 and in the space behind the piston head portion 33 will move the valve 157 from its seat, thereby establishing a substantially free flow of fluid from the fluid chamber through the passage 153 into the compression chamber provided between the cover 27 and the piston head portion 33.

As soon as the spring has reached its limit of flexure, it will have a tendency to return to normal position with a sudden, rebounding movement, which causes rebound shocks to be transmitted to the frame and consequently to the body of the vehicle. As soon as spring 22 tends to rebound, connecting rod 43 will move the shock absorber operating arm 42 in a clockwise direction, thus the piston 31 will be moved toward the left in the cylinder 25, causing pressure to be exerted upon the fluid in the compression chamber at the end 27 of the cylinder. It will of course be understood that on the flexing of the spring the piston will have moved toward the right a considerable distance and thus the end of piston head portion 33 will be somewhat to the right of the widest portion of the recess 68 of metering pin 65. As the piston head portion 33 moves toward its end of the cylinder, fluid from its compression chamber will escape through the orifice presented between the sloping surface 69 of the recess 68 and the piston head portion 33 and consequently as the piston moves over the said sloping surface 69 toward the widest part of recess 68, the fluid flow through this orifice will gradually, decreasingly be restricted up until the point at which the outer edge of the piston head portion 33 will have reached the widest part of recess 68, after which continued movement of piston head portion 33 toward its end of the cylinder will gradually, increasingly restrict the fluid flow from the compression chamber.

From this it may be seen that the return movement of spring 22 from its flexed position toward the normal position will at first be resisted gradually, decreasingly throughout a portion of its travel, and then gradually, increasingly throughout the remaining portion of its travel, consequently the return of this spring is cushioned, rebound is dissipated, and jars and jolts are substantially eliminated.

In each of the piston head portions are provided valves, one numbered 60 and the other numbered 160, which are adapted to provide an additional flow of fluid from either of the compression chambers in response to excessive pressure therein. As long as the pressure in said compression chambers remains below a predetermined value, these valves 60 and 160 will hold their fluid flow passages tightly closed, the escape of fluid from either of the compression chambers being controlled by their respective metering pin recesses.

In this device applicant has presented a shock absorber of simple structure and design which may be commercially produced at a minimum expenditure of time and labor and which will operate effectively to cushion the movements of the springs and frame of the vehicle substantially to eliminate all jars and jolts caused by the road wheels of the vehicle striking obstructions in the roadway.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a closed end cylinder and a fluid chamber in communication therewith; a piston in said cylinder providing a fluid compression chamber in the end of the cylinder and having passages providing for the transfer of fluid from one side of the piston to the other; means within the casing for reciprocating the piston; a valve mechanism supported by the piston for establishing a free flow of fluid from the fluid chamber through one of the piston passages into the fluid compression chamber in response to the movement of the piston in one direction; means within the cylinder, cooperating with the piston to establish a restricted flow of fluid from the fluid compression chamber into the fluid chamber of the casing in response to movement of the piston in the other direction; and a valve adapted to cooperate with a part of the aforementioned valve mechanism to establish a flow of fluid from the compression chamber through the other piston passage into the fluid chamber of the casing in response to excessive fluid pressure within the compression chamber.

2. A shock absorber comprising in combination, a casing presenting a closed end cylinder and a fluid chamber in communication therewith; a piston in said cylinder providing a fluid compression chamber in the end of the cylinder and having passages providing for the transfer of fluid from one side of the piston to the other; means within the casing for reciprocating the piston; a valve mechanism supported by the piston for establishing a free flow of fluid from the fluid chamber through one of the piston passages into the fluid compression chamber in response to the movement of the piston in one direction; means within the cylinder, cooperating with the piston to establish a restricted flow of fluid from the fluid compression chamber into the fluid chamber of the casing in response to movement of the piston in the other direction; and a spring loaded valve supported within the other piston passage, yieldably engaging a part of the aforementioned valve mechanism, said valve providing for a restricted flow of fluid from the compression chamber through said other piston passage to the fluid chamber, only when the fluid pressure within said compression chamber exceeds a predetermined value.

3. A shock absorber comprising in combination, a casing presenting a closed end cylinder and a fluid chamber in communication therewith; a piston in said cylinder providing a fluid compression chamber in the cylinder, said piston having a central passage and a passage centrally offset in its head portion; a tubular member secured in said central passage and extending from the head portion; a valve slidably supported on said tubular member, closing the offset passage in the piston head when the piston is moving in one direction and adapted to establish a free flow of fluid from the fluid chamber through the offset passage in the piston head into the compression chamber when the piston is moved in the other direction; a spring-loaded valve in the central piston passage yieldably maintained in engagement with the inner end of the tubular member normally to hold it closed, said valve being adapted to establish a restricted flow of fluid from the compression chamber through said tubular member and the central piston passage into the fluid chamber when the pressure within the compression chamber exceeds a predetermined value.

4. A shock absorber, comprising in combination, a casing presenting a cylinder and a fluid chamber; a piston in said cylinder providing a compression chamber therein; means for operating said piston; means for establishing a free flow of fluid from the fluid chamber through the piston into the compression chamber in response to the movement of the piston in one direction; means within the cylinder and cooperating with the piston to establish a restricted flow of fluid from the compression chamber, past the piston into the fluid chamber in response to the movement of the piston in the other direction; and means comprising a valve and a portion of the aforementioned means for establishing the free flow of fluid, adapted to establish an additionally restricted flow of fluid from the compression chamber to the fluid chamber, only when the pressure upon the fluid within said compression chamber exceeds a predetermined value.

5. A shock absorber, comprising in combination, a casing presenting a cylinder closed at both ends and a fluid chamber; a fluid displacement member in said cylinder providing a double-headed piston having passages in each of its heads in communication with the fluid chamber; a valve mechanism in each piston head portion adapted to establish a free flow of fluid from the fluid chamber through one of the passages in the respective piston heads into a respective cylinder end as the fluid displacement member is moved away from said cylinder end; a relief valve adapted to cooperate with a part of the aforementioned valve mechanism to establish a restricted flow of fluid from either one cylinder end or the other where the fluid pressure in either of said ends exceeds a predetermined value as the displacement member is moved toward said end; and means within the casing for reciprocating the fluid displacement member.

6. A shock absorber, comprising in combination, a casing presenting a cylinder closed at both ends and a fluid chamber; a fluid displacement member in said cylinder providing a double-headed piston having passages in each of its heads in communication with the fluid chamber; a valve mechanism in each piston head portion adapted to establish a free flow of fluid from the fluid chamber through one of the passages in the respective piston heads into a respective cylinder end as the fluid displacement member is moved away from said cylinder end; a relief valve adapted to cooperate with a part of the aforementioned valve mechanism to establish a restricted flow of fluid from either one cylinder end or the other when the fluid pressure in either of said ends exceeds a predetermined value as the displacement member is moved toward said end; means within the cylinder, cooperating with the fluid displacement member as it is moved toward one or the other cylinder ends, to establish a restricted flow of fluid from the respective cylinder ends toward which said member is moving, to the fluid chamber.

7. A shock absorber, comprising in combination, a casing presenting a cylinder closed at both ends and a fluid chamber; a fluid displacement member in said cylinder providing a double-headed piston having passages in each of its heads in communication with the fluid chamber; a valve mechanism in each piston head portion adapted to establish a free flow of fluid from the fluid chamber through one of the passages in the respective piston heads into a respective cylinder end as the fluid displacement member is moved away from said cylinder end; a relief valve adapted to cooperate with a part of the aforementioned valve mechanism to establish a restricted flow of fluid from either one cylinder end or the other when the fluid pressure in either of said ends exceeds a predetermined value as the displacement member is moved toward said end; and a metering pin supported within the cylinder between the ends thereof, cooperating with the respective piston head portion of the fluid displacement member variably to restrict the flow of fluid from one or the other cylinder end as said member is moved toward one or the other cylinder end respectively.

8. A shock absorber, comprising in combination, a casing presenting a cylinder having closed ends and a fluid chamber in communication therewith; a double-headed piston in said cylinder providing fluid chambers at each end of the cylinder and having fluid passages in each of its head portions; a tubular member in each piston head portion, secured in a passage of the respective head portions; a spring loaded valve slidably supported on each tubular member and normally closing one passage of its respective piston head; and a second spring loaded valve in the other passage of each piston head, normally engaging the respective tubular member to close the passage therethrough.

9. A shock absorber, comprising in combination, a casing presenting a cylinder having closed ends and a fluid chamber in communication therewith; a double-headed piston in said cylinder providing fluid chambers at each end of the cylinder and having fluid passages in each of its head portions; a tubular member in each piston head portion, secured in a passage of the respective head portions; a pair of valves in each piston head portion yieldably urged in opposite directions, one valve being slidably supported on the tubular member and yieldably closing one of the piston head passages, the other valve normally being seated upon one end of said tubular member and yieldably closing the other passage of said piston head passages.

10. A shock absorber, comprising in combination, a casing presenting a cylinder having closed ends and a fluid chamber in communication therewith; a double-headed piston in said cylinder, having a central chamber and providing compression chambers at each end of the cylinder, said piston having passages in each of its head portions providing communication between the central chamber and the respective compression chambers; a tubular member supported by each piston head portion and substantially coaxial thereof, said tubular members aligning with one of the passages in each respective head portion of the piston; an annular valve seat presented by each piston head portion, substantially coaxial of the tubular member; a valve slidably supported on each tubular member; a spring on each tubular member yieldably urging the respective valve upon its valve-seat normally to close one of the passages in each piston head portion; a valve in the passage of each piston head portion that aligns with its respective tubular member; a spring yieldably urging said valve into engagement with one end of the respective tubular member normally to hold it closed; and means within the casing for reciprocating the piston.

11. A shock absorber comprising, in combination, a casing presenting a cylinder; a piston in said cylinder, having conduits for the transfer of fluid from one side of the piston to the other, one of said conduits receiving one end of a tubular member; a valve slidably supported upon said tubular member and adapted to close the one conduit as the piston moves in one direction, and a valve slidably carried within the piston conduit and yieldably urged to engage the end of the tubular member, thereby completely closing the tubular member.

In testimony whereof I hereto affix my signature.

WILLIAM A. CHRYST.